Feb. 21, 1933.  E. J. FARKAS  1,898,721
VEHICLE SHOCK ABSORBER MOUNTING
Filed Nov. 19, 1930   2 Sheets-Sheet 1
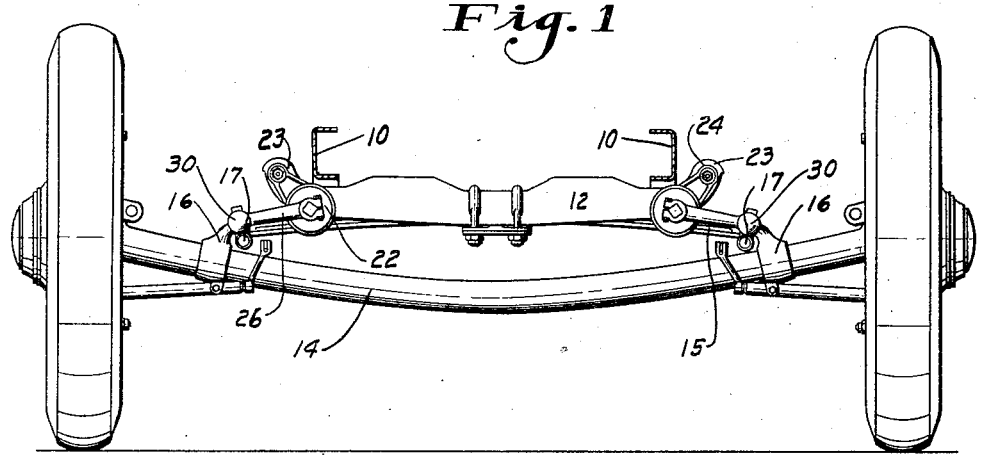
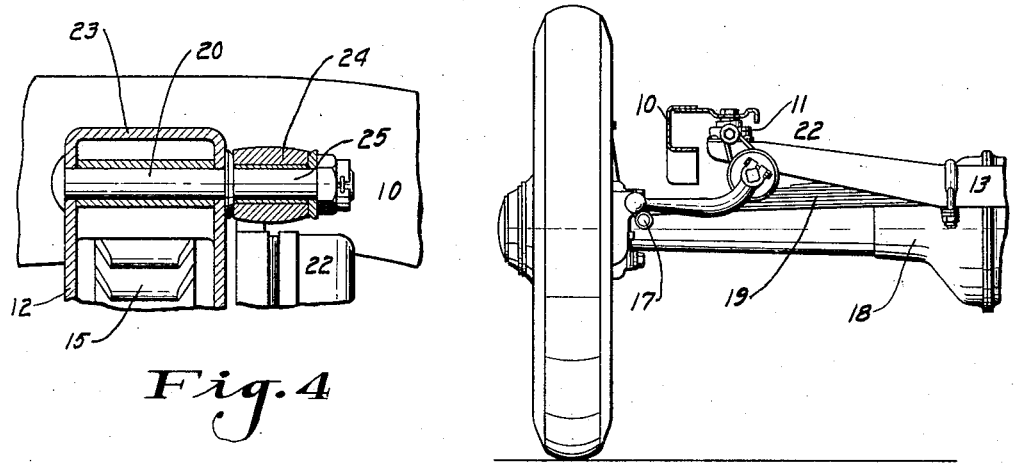
INVENTOR.
E. J. Farkas.
ATTORNEY.

Feb. 21, 1933.  E. J. FARKAS  1,898,721
VEHICLE SHOCK ABSORBER MOUNTING
Filed Nov. 19, 1930  2 Sheets-Sheet 2

INVENTOR.
E. J. Farkas
BY
ATTORNEY.

Witness.
E. C. McRae.

Patented Feb. 21, 1933

1,898,721

UNITED STATES PATENT OFFICE

EUGENE J. FARKAS, OF DETROIT, MICHIGAN, ASSIGNOR TO FORD MOTOR COMPANY, OF DEARBORN, MICHIGAN, A CORPORATION OF DELAWARE

VEHICLE SHOCK ABSORBER MOUNTING

Application filed November 19, 1930. Serial No. 496,684.

The object of my invention is to provide a vehicle having a shocker absorber mounting of simple, durable and inexpensive construction.

Still a further object of my invention is to provide a shock absorber mounting especially adapted for use in connection with hydraulic oscillating type shock absorbers, which mounting will eliminate one of the heretofore essential elements of the shock absorber mounting.

More particularly, my invention discloses a novel structure wherein the body portion of such shock absorber is pivotally secured to the vehicle frame so that the operating arm may extend outwardly to the vehicle axle where it is directly secured thereto. It has heretofore been customary when mounting hydraulic shock absorbers to rigidly bolt the body portion of the shock absorber to the vehicle frame with the shock absorber actuating arm extending horizontally, and to connect the free end of this arm to the adjacent axle by means of a link, such link having a ball and socket connection on each end thereof. These ball and socket devices have heretofore been necessary to compensate for the variation from coincident paths described by the irregular vertical or arcuate movement of the axle and the oscillating movement of the shock absorber arm. In my improved device, the shock absorber arm is directly connected to the axle thereby eliminating the connecting link between the arm and the axle, thus providing a cheaper construction and at the same time providing one which has at least the equivalent if not a longer life than the conventional structure, due to the elimination of one of the ball joints. In this device a single ball joint is provided for correlating the paths described by the axle and operating arm.

With these and other objects in view, my invention consists in the arrangement, construction and combination of the various parts of my improved device, as described in the specification, claimed in my claims, and illustrated in the accompanying drawings, in which:

Figure 1 shows a front elevation of the vehicle chassis having shock absorber installed thereon according to this invention.

Figure 4 shows a sectional view taken on the lines 4—4 of Figure 2, and

Figure 5 shows a fragmentary rear view of my chassis, showing the adaptation of my device to the rear of the vehicle.

Figure 2:
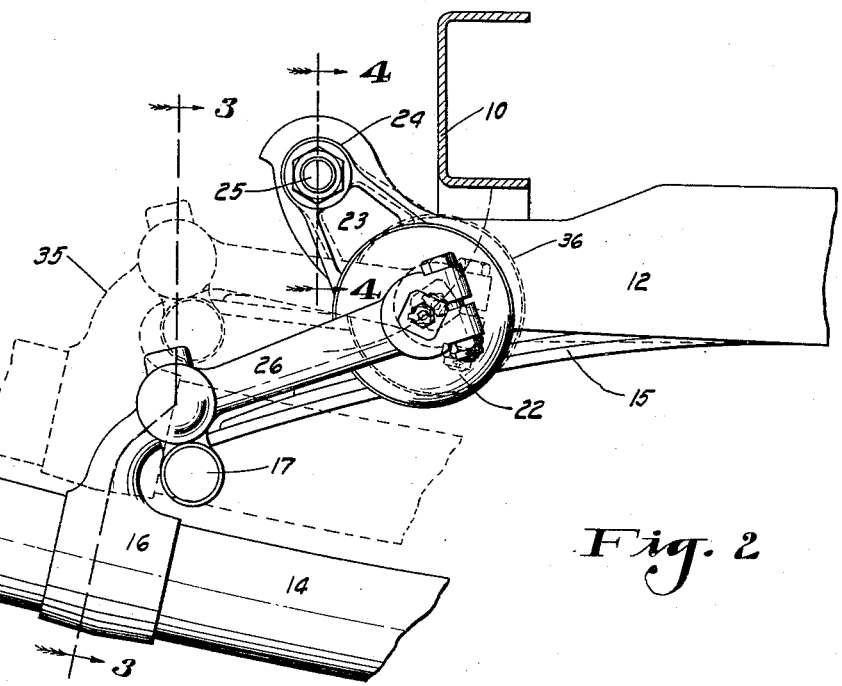
Figure 2 shows an enlarged view of one of the shock absorbers, shown in Figure 1.

Referring to the accompanying drawings, I have used the reference numeral 10 to indicate generally the side members of a vehicle frame which, in this instance, are resiliently mounted by means of spring cushions 11 on front and rear frame cross members 12 and 13, respectively. The resilient frame member here shown is only incidental to my invention, as a conventional rigid frame may be used in its place with equally advantageous results.

A front axle 14 is provided beneath the front cross member 12 which axle has a pair of spaced spring perches 16 mounted thereon to which a transverse spring 15 is pivotally secured by means of a pair of spring shackles 17 in the common manner of mounting transverse springs.

Likewise, a rear axle 18 is provided beneath the rear cross member 13 upon which axle the cross member is supported by a rear transverse spring 19.

It is the purpose of shock absorbers to control the movement of that portion of the vehicle above the springs relative to axles or unsprung portion. Consequently, my shock absorbers to accomplish this result are connected between the frame cross members 12 and 13 and the axles 14 and 18. These shock absorbers are of the oscillating vane hydraulic type. Instead of fastening the body portions of my shock absorbers fixedly to either the axles or the frame cross members, I have provided the body portion thereof, which I have given the reference numeral 22, with an arm 23 which extends outwardly from one side thereof, the outer end of which is provided with a bearing 24, around which the body portion 22 may oscillate.

Referring to Figures 2 and 4, pins 20 extend transversely through each of the ends of each cross member 13, the outer end of each pin forming a trunnion 25. The pins 20 are fixedly secured in each cross member by riveting. Upon these trunnions the bearings 24 are rotatably mounted so that the body portions of the shock absorbers may swing inwardly and upwardly on the frame.

An operating arm 26 extends laterally from the body of the shock absorber to position adjacent to one of the spring perches 16. Each of the spring shackles 17 are pivotally secured to the adjacent spring perch 16 by a shackle bolt 27, the outer end 28 of which is machined to a ball shape. The shock absorber arm 26 is provided with a cup-shaped outer end, which cup is adapted to fit over the ball 28. A split bearing 29 is mounted over the ball 28 and within the cup-shaped end 30 so that a limited reciprocal movement in the cup member is permitted by the bearing and ball. A suitable felt washer 31 is disposed between the rim of the cup and the shank of the ball thereby preventing the escape of lubricant from the ball or the introduction of dirt into the bearing surfaces.

It may be well to mention that the split bearing 29, although forming per se no part of my invention, is constructed with the axis of the ball seats about $\frac{1}{16}$ of an inch eccentric to their peripheries. Each half subtends somewhat less than 180 degrees of arc and consequently, oscillation of one-half of the bushing relative to the other will contract and expand the space between the ball seats. A helical spring having its ends fastened to the respective halves of the bushing is housed in the cup end 30 and resiliently oscillates or urges the bushings to perfectly fit the ball 30 and thus take up any wear which may have developed between the ball and the ball seats.

Figure 3:
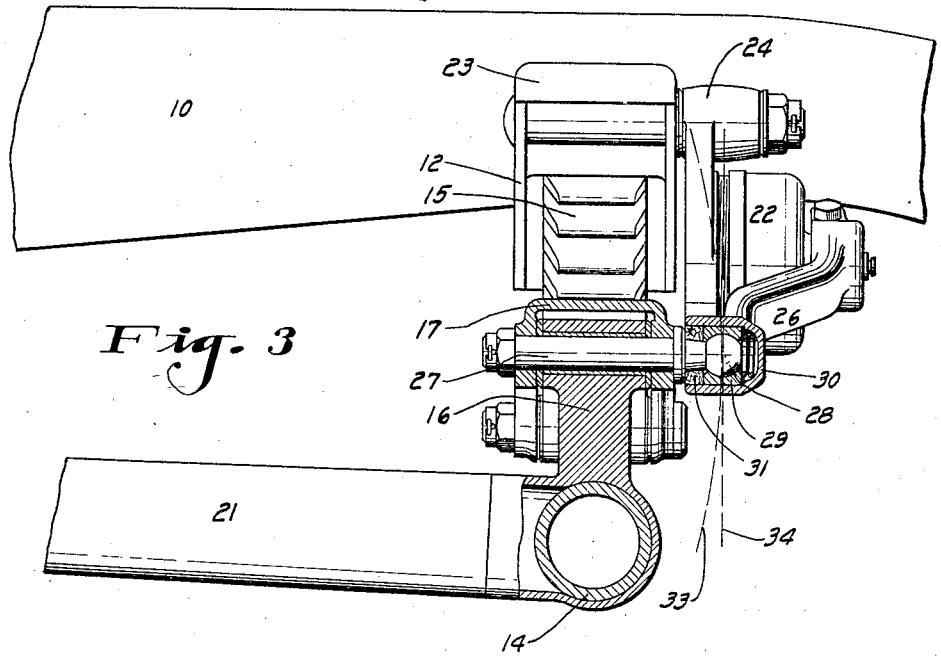
Figure 3 shows a sectional view taken on the lines 3—3 of Figure 2.

In the vehicle shown, as in most cars employing transverse springs, a pair of diagonal radius rods 21 extend from the outer ends of the front axle rearwardly where they are pivotally secured to the center of the frame, thus guiding the front axle in an arcuate path of vertical reciprocation. This path over which the axle 14 and consequently the ball end 28 of the bolt 27 travels is shown by the dotted lines 33, in Figure 3; while the vertical path in which the shock absorber arm 26 operates is illustrated by the vertical dotted line 34. It will thus be seen that when the axle is vertically reciprocated the ball 28 will also reciprocate longitudinally through a very short distance in the cup 30 due to the non-coincidence of these two paths. However, it will be seen that no binding or undue wear is caused by this small reciprocation, as the bearing 29 is free for a limited movement in the cup, as amply lubricated and proportioned surfaces are provided to absorb the loads of the shock absorber.

Referring now to Figure 2, the upper portion of the axle 14 is shown by the dotted line 35. In assuming this position the ball 28 is raised on an irregular path so that the body portion of the shock absorber is oscillated around the trunnion 25 to the position shown by the dotted lines 36. Any irregular motion of the axle due to side-sway of the body or the like simply oscillates the body member 22 to a greater or lesser degree around the trunnion 25 to fully compensate for the transverse irregular movement of the axle relative to the frame member. Likewise, the arcuate movement of the axle is compensated for by the reciprocation of the bearing 29 in the cup 30.

Among the many advantages arising from the use of my improved device it may be well to mention that I have provided a shock absorber mounting where one of the ball connections and the shock absorber drag link are eliminated, and wherein a simple connection, capable of compensating for the non-symmetrical paths described by the shock absorber operating arm and the adjacent portion of the axle, is readily provided. This construction materially lessens the cost of mounting hydraulic shock absorbers.

Some changes may be made in the arrangement, construction and combination of the various parts of my improved device, without departing from the spirit of my invention, and it is my intention to cover by my claims such changes as may reasonably be included within the scope thereof.

I claim as my invention:

1. In a shock absorber mounting, an axle having a vehicle frame spring suspended thereon, said axle pivoting in a vertical path about a fixed point on said frame, a shock absorber body portion having an arm extending radially therefrom, the outer end of which is pivotally connected to said frame so that said body portion may swing in a transverse plane, a ball member connected to said axle, and means for securing said ball member in the free end of said arm so as to permit both universal pivoting movement and transverse movement of the ball relative to the arm to thereby compensate for the non-coinciding paths of said ball and arm.

2. A hydraulic shock absorber comprising a body portion having a fixed radial arm extending therefrom, an oscillating actuating arm extending from said shock absorber, a trunnion upon said frame around which said fixed arm is free to pivot, a ball member upon said axle pivotally connected to the outer end of said oscillating arm, and means for permitting transverse movement between said ball and arm, to compensate for the non-coincidence of the paths of travel of said ball and arm.

3. In a shock absorber mounting, an axle having a vehicle frame spring suspended thereon, a shock absorber comprising a body portion having an arm extending radially therefrom the outer end of which is pivotally connected to the vehicle frame so that the body portion may swing in a transverse plane, an operating arm extending from said shock absorber to position adjacent to said axle, and means connecting said axle and the free end of said operating arm, said means permitting both rotary movement and transverse movement of the axle relative to said operating arm for the purpose described.

4. In a shock absorber mounting, an axle having a vehicle frame spring suspended thereon, a shock absorber comprising a body portion having an arm extending radially therefrom the outer end of which is pivotally connected to said frame so that said body portion may swing relative thereto, an operating arm extending from said shock absorber to position adjacent to the vehicle axle, said operating arm having its free end formed as a sleeve, a ball member fixed upon said axle adapted to enter said sleeve, and means disposed between said ball and sleeve permitting both universal movement of said operating arm around said ball and axial movement of said ball in said sleeve for the purpose described.

5. In a shock absorber mounting, an axle having a vehicle frame spring suspended thereon by means of a transverse spring, a radius rod extending rearwardly from said axle to position where its rearmost end is anchored to the vehicle frame, whereupon flexing said spring will move the axle in an arcuate path around said anchor, a shock absorber mounted upon said frame, an operating arm extending from said shock absorber adapted to swing in a transverse vertical plane adjacent to the arcuate path of the axle, said operating arm having its free end formed as a sleeve, a ball member mounted upon said axle adapted to enter said sleeve, and means disposed between said ball and sleeve member compensating for the non-coincidence of the paths of travel of said axle and operating arm.

6. In a shock absorber mounting, an axle having a vehicle frame spring suspended thereon by means of a transverse spring, said axle pivoting in a vertical path about a fixed point on said frame, a shock absorber body portion having an arm extending radially therefrom the outer end of which is pivotally connected to the frame so that said body will swing in a transverse plane, the outer end of said operating arm having a horizontally extending sleeve-like member formed thereon, a spring shackle bolt associated with said axle the outer end of which is formed as a ball and positioned so as to lie within said sleeve, and a bushing disposed between said ball and sleeve adapted to compensate for the non-coincidence of the paths of travel of said axle and shock absorber operating arm.

7. In a shock absorber mounting, an axle having a vehicle frame spring suspended thereon, said axle pivoting in a vertical path about a fixed point on said frame and said axle having a ball member fixedly secured thereto which upon the flexing of said spring travels through an arcuate path, a shock absorber associated with said frame having an operting arm extending to position adjacent to said ball, the normal path of movement of which arm lies tangent to the path of said ball member, and means connecting said ball member and arm permitting both relative rotary movement and relative longitudinal movement therebetween to compensate for the non-coincidence of the arcuate and tangential respective paths of said ball and operating arm.

8. A device, as claimed in claim 7, wherein a sleeve is formed on the free end of said operating arm into which said ball member extends, and a bushing having a cylindrical exterior and spherical interior is disposed between said sleeve and ball to compensate for the non-coincidence of said arcuate and tangential paths.

EUGENE J. FARKAS.